US009040608B2

(12) United States Patent
Friedel et al.

(10) Patent No.: US 9,040,608 B2
(45) Date of Patent: May 26, 2015

(54) CURABLE MIXTURE

(75) Inventors: Manuel Friedel, Zürich (CH); Philipp Albert, Lörrach (DE); Burkhard Standke, Lörrach (DE); Spomenko Ljesic, Rheinfelden (DE); Ulf Kehrer, Hattersheim (DE)

(73) Assignees: Evonik Degussa GmbH, Essen (DE); Akzo Nobel Chemicals International B.V., Amersfoort (NL)

( * ) Notice: Subject to any disclaimer, the term of this patent is extended or adjusted under 35 U.S.C. 154(b) by 140 days.

(21) Appl. No.: 13/638,733

(22) PCT Filed: Mar. 30, 2011

(86) PCT No.: PCT/EP2011/054914
§ 371 (c)(1),
(2), (4) Date: Dec. 17, 2012

(87) PCT Pub. No.: WO2011/121027
PCT Pub. Date: Oct. 6, 2011

(65) Prior Publication Data
US 2013/0085210 A1    Apr. 4, 2013

(30) Foreign Application Priority Data

Apr. 1, 2010    (DE) .......................... 10 2010 003 589

(51) Int. Cl.
| | |
|---|---|
| C04B 20/10 | (2006.01) |
| C04B 28/04 | (2006.01) |
| C04B 24/42 | (2006.01) |
| C04B 28/02 | (2006.01) |
| C04B 40/00 | (2006.01) |
| C08K 9/10 | (2006.01) |
| C08L 29/04 | (2006.01) |
| C04B 111/20 | (2006.01) |
| C04B 111/27 | (2006.01) |

(52) U.S. Cl.
CPC ................. *C04B 24/42* (2013.01); *C04B 28/02* (2013.01); *C04B 40/0042* (2013.01); *C04B 2111/203* (2013.01); *C04B 2111/27* (2013.01); *C08K 9/10* (2013.01); *C08L 29/04* (2013.01)

(58) Field of Classification Search
CPC ............ C04B 24/42; C08K 9/10; C08L 29/04
USPC ....................... 524/5, 263; 106/708, 806, 724
See application file for complete search history.

(56) References Cited

U.S. PATENT DOCUMENTS

| | | | |
|---|---|---|---|
| 4,704,416 A | 11/1987 | Eck et al. | |
| 4,851,047 A | 7/1989 | Demlehner et al. | |
| 5,426,205 A | 6/1995 | Kirchmeyer et al. | |
| 5,624,481 A | 4/1997 | Gerhardinger et al. | |
| 5,798,429 A | 8/1998 | Hager et al. | |
| 5,849,942 A | 12/1998 | Standke et al. | |
| 5,990,212 A | 11/1999 | Hager et al. | |
| 6,090,868 A | 7/2000 | Eck et al. | |
| 6,139,622 A | 10/2000 | Göbel et al. | |
| 6,268,423 B1 | 7/2001 | Mayer et al. | |
| 6,641,870 B2 | 11/2003 | Bartkowiak et al. | |
| 6,685,766 B2 | 2/2004 | Standke et al. | |
| 6,770,327 B2 | 8/2004 | Edelmann et al. | |
| 6,780,955 B2 | 8/2004 | Barfurth et al. | |
| 6,841,197 B2 | 1/2005 | Standke et al. | |
| 7,427,442 B2 | 9/2008 | Albert et al. | |
| 7,781,520 B2 | 8/2010 | Standke et al. | |
| 7,939,616 B2 | 5/2011 | Barfurth et al. | |
| 8,039,110 B2 | 10/2011 | Jenkner et al. | |
| 8,101,682 B2 | 1/2012 | Standke | |
| 8,147,918 B2 | 4/2012 | Standke et al. | |
| 8,188,266 B2 | 5/2012 | Edelmann et al. | |
| 8,298,679 B2 | 10/2012 | Albert et al. | |
| 8,394,972 B2 | 3/2013 | Wassmer et al. | |
| 2007/0054056 A1 | 3/2007 | Albert et al. | |
| 2007/0110912 A1 | 5/2007 | Standke | |
| 2008/0187673 A1 | 8/2008 | Standke et al. | |
| 2008/0206572 A1 | 8/2008 | Edelmann et al. | |
| 2009/0005518 A1 | 1/2009 | Just et al. | |
| 2009/0007818 A1 | 1/2009 | Militz et al. | |

(Continued)

FOREIGN PATENT DOCUMENTS

| | | |
|---|---|---|
| DE | 2 212 605 | 11/1972 |
| DE | 2 301 176 | 7/1973 |

(Continued)

OTHER PUBLICATIONS

U.S. Appl. No. 13/580,194, filed Aug. 21, 2012, Borup, et al.
U.S. Appl. No. 13/638,702, filed Oct. 25, 2012, Friedel, et al.
U.S. Appl. No. 13/638,734, filed Oct. 1, 2012, Friedel, et al.
U.S. Appl. No. 13/640,638, filed Oct. 11, 2012, Friedel, et al.
U.S. Appl. No. 13/639,619, filed Oct. 1, 2012, Friedel, et al.
U.S. Appl. No. 13/989,205, filed May 23, 2013, Friedel, et al.
Adebajo, M.O., et al., "Porus Materials for Oil Spill Cleanup: A Review of Synthesis and Absorbing Properties," Journal of Porus Materials, vol. 10, No. 3, pp. 159-170, (Sep. 2003).
"Commercial Absorbent Information," MOP K-sorb Hegsorb, Total 17 Pages, (Jul. 23, 2008).
International Search Report Issued Jul. 12, 2011 in PCT/EP11/54914 Filed Mar. 30, 2011.
U.S. Appl. No. 14/007,481, filed Sep. 25, 2013, Albert, et al.
U.S. Appl. No. 14/111,185, filed Oct. 11, 2013, Friedel, et al.
U.S. Appl. No. 14/358,437, filed May 15, 2014, Ljesic, et al.

*Primary Examiner* — Robert Harlan
(74) *Attorney, Agent, or Firm* — Oblon, McClelland, Maier & Neustadt, L.L.P.

(57) ABSTRACT

The present invention relates to a curable mixture suitable for obtaining "easy-to-clean" properties in the cured mixture, comprising at least one mineral binder, a powder comprising at least one fluoroorganyl-substituted silicon compound encapsulated in a water-soluble polymer, the amount of the silicon compound being 0.001% to 8% by weight, based on the present mixture, and optionally further adjuvants, and also to a process for preparing the mixture and to the use thereof. The invention further relates to a water-redispersible powder and also to a corresponding intermediate for use in the curable mixture in order to obtain "easy-to-clean" properties in the cured mixture. Also claimed, furthermore, is a process for preparing the powder, and the use thereof.

24 Claims, No Drawings

(56) References Cited

U.S. PATENT DOCUMENTS

| | | |
|---|---|---|
| 2010/0119851 A1 | 5/2010 | Giessler-Blank et al. |
| 2010/0152332 A1 | 6/2010 | Lecomte et al. |
| 2010/0159144 A1 | 6/2010 | Standke et al. |
| 2010/0209719 A1 | 8/2010 | Borup et al. |
| 2010/0285329 A1 | 11/2010 | Molz et al. |
| 2010/0324205 A1 | 12/2010 | Maier et al. |
| 2011/0124794 A1 | 5/2011 | Friedel et al. |
| 2011/0259240 A1 | 10/2011 | Jenkner et al. |
| 2011/0308423 A1 | 12/2011 | Friedel et al. |
| 2012/0031302 A1 | 2/2012 | Albert et al. |
| 2012/0204762 A1 | 8/2012 | Albert et al. |
| 2014/0182487 A1 | 7/2014 | Friedel et al. |

FOREIGN PATENT DOCUMENTS

| | | | |
|---|---|---|---|
| DE | 43 29 262 | 3/1995 | |
| DE | 195 42 443 | 5/1997 | |
| DE | 196 49 955 | 6/1998 | |
| DE | 100 62 585 | 6/2002 | |
| DE | 10 2004 053 384 | 5/2006 | |
| DE | 10 2005 060 402 | 6/2007 | |
| DE | 10 2008 007 190 | 8/2009 | |
| EP | 0 228 657 | 7/1987 | |
| EP | 0 278 518 | 8/1988 | |
| EP | 0 327 215 | 8/1989 | |
| EP | 0 561 708 | 9/1993 | |
| EP | 0 748 357 | 12/1996 | |
| EP | 0 795 592 | 9/1997 | |
| EP | 0 826 650 | 3/1998 | |
| EP | 0 913 370 | 5/1999 | |
| EP | 0 919 526 | 6/1999 | |
| EP | 1 225 188 | 7/2002 | |
| EP | 1 262 464 | 12/2002 | |
| EP | 1 982 964 | 10/2008 | |
| EP | 1 982 964 A1 * | 10/2008 | ............. C04B 24/42 |
| JP | 55-42272 | 3/1980 | |
| JP | 63 176101 | 7/1988 | |
| JP | 63-201049 | 8/1988 | |
| JP | 1-224284 | 9/1989 | |
| JP | 3-261042 | 11/1991 | |
| JP | 7-330413 | 12/1995 | |
| JP | 2010-525167 | 7/2010 | |
| WO | 93 15833 | 8/1993 | |
| WO | 95 23804 | 9/1995 | |
| WO | 2005 009700 | 2/2005 | |
| WO | 2005 066236 | 7/2005 | |
| WO | WO 2005/068401 A1 | 7/2005 | |
| WO | 2005 118683 | 12/2005 | |
| WO | 2006 137588 | 12/2006 | |
| WO | 2007 048745 | 5/2007 | |
| WO | 2008 062018 | 5/2008 | |
| WO | 2010 052201 | 5/2010 | |
| WO | 2010 136286 | 12/2010 | |
| WO | 2011 038956 | 4/2011 | |
| WO | 2011 120735 | 10/2011 | |
| WO | 2011 121032 | 10/2011 | |
| WO | 2011 121038 | 10/2011 | |
| WO | 2011 128127 | 10/2011 | |
| WO | 2011 128128 | 10/2011 | |
| WO | 2011 128129 | 10/2011 | |
| WO | 2012 084401 | 6/2012 | |

* cited by examiner

CURABLE MIXTURE

The present invention relates to a curable mixture, to a water-redispersible powders, to methods for producing the mixture and the powder, to the use of the powder in the curable mixture, and to the use of the curable mixture, where the cured mixture possesses "easy-to-clean" properties.

The water-redispersible powder of the invention is identified here and below as a fluoroorganyl-substituted silicon compound which is capsulate or encapsulated in a water-soluble polymer and dried, and is also called powder for short above and below.

Curable mixtures, as for example hydraulically setting materials such as cement-bonded materials, are used at numerous relevant places in modern construction, as for example for producing concrete paving slabs for driveways, footpaths or terraces, for joints and surface coatings of all kinds, such as renders, for example. In the exterior and interior sectors, the soiling of the surfaces of such cured mixtures by any of a wide variety of materials, such as, for example, traffic exhaust gases and industrial waste gases, more particularly soots, flower pollen, grass stains, oils, more particularly engine oils, cosmetics, food and beverage residues, more particularly cola, coffee, red wine or ketchup, and also as a result of the growth of microorganisms, such as algae or fungi, constitutes a major problem from an esthetic standpoint. Equipping cured mixtures, more particularly hydraulically set materials, in such applications with dirt repellency properties [also called "easy-to-clean" or ETC below] is therefore desirable.

Dirt repellency properties are understood to be the capacity of the surface to prevent the penetration of both aqueous and oily substances into the material and to facilitate the removal of these substances from the surface. Furthermore, inks, paints, dusts, and also the growth of any of a very wide variety of materials, such as moss and algae, for example, are also to be easily removable by cleaning from dirt-repellent surfaces. The soiling properties can be tested in accordance with DIN EN ISO 10545-14. Accordingly, materials which have such "easy-to-clean" properties are to be not only water repellent—that is, hydrophobizing—but also to possess oil repellency properties, i.e., oleophobizing properties.

It is known that "easy-to-clean" properties can be generated by an aftertreatment of completed, cured surfaces with various materials. Thus, for instance, EP 0 838 467 teaches the use of a fluorine-containing silane or silane system for surface enhancement. A disadvantage of such systems for the aftertreatment of the surface is the need for a further operating step after the production of such materials; another disadvantage is that the durability of such coatings is frequently too low, since they are eroded by weathering and abrasion.

Also known is the enhancement of hydraulically hardening materials, more particularly cement-bound materials, through the addition of body modifiers. Accordingly, EP 0 913 370 teaches the use of aqueous, silane-containing emulsions for obtaining water repellency (hydrophobic) properties in such materials. Unfortunately, the teaching does not lead to the desired "easy-to-clean" surfaces. Moreover, there is no mention of fluorine-functionalized silicon compounds.

U.S. Pat. No. 5,650,004 discloses a cement-bound render mixture which is used to seal swimming pools. The water repellency properties and improved durability of the render mixture are achieved through the addition of silane-modified powders and pozzolanic fillers. A disadvantage of this render mixture is that although long-term water repellency properties can be achieved, thus meaning that aqueous soiling as well can be repelled, there is no acquisition of dirt repellency properties in the sense described above. Fluorine-containing silicon compounds, moreover, are also not mentioned.

DE 10 346 082 discloses complex hydraulically hardening mixtures whose specific mixing leads to a modified microstructure. As a result, wear-resistant workpieces having surfaces that are dirt-repellent to some extent are obtained. Fluorine-containing silicon compounds are not mentioned.

EP 1 445 242 discloses non-cement-bonded renders and coatings for exterior walls, having dirt repellency properties. The dirt repellency properties are achieved by reducing the microroughness in such a way that dirt particles are unable to penetrate the pore space and settle there. A disadvantage is that non-cement-bonded render mixtures based on potassium waterglass are modified as such. Moreover, there is no mention of fluorine-containing silicon compounds.

EP 1 262 464 describes a cement-containing mortar powder in which at least one component—for example, the cement powder or quartz particles of the mortar powder—has been surface-treated with a fluorochemical compound, such as a silane, for example. The production of these mortar components coated with a fluorochemical compound is complex and includes, among other steps, the reaction of the cement-containing mixture with water, organic solvent, and the fluorochemical compound, followed by subsequent drying and homogenizing. The pretreated mortar powders, after they have been stirred with water, applied and cured, exhibit oil and water repellency properties. Since at least one component of such mortar powders has been pretreated with a fluorochemical compound, such mortars display hydrophobizing, i.e., water repellency, properties even when being stirred with water, and this results in very poor wetting.

As is apparent from the prior art, it is possible to equip substrate surfaces, especially inorganic substrate surfaces, with "easy-to-clean" properties by subsequent superficial application of fluoroorganyl-substituted silicon compounds, necessitating an additional workstep. If the substrate surface thus treated is then damaged, in the course for example of a mechanical stress through abrasion, the "easy-to-clean" properties disappear along with the substrate eroded from the surface.

It was an object of the present invention, therefore, to provide a curable mixture, the cured mixture being producible with as few worksteps as possible. Moreover, the cured mixture, more particularly its surface, is to have sufficiently good dirt repellency properties, with such "easy-to-clean" properties being, in particular, extremely durable, even after damage to the surface.

This object is achieved in accordance with the invention in line with the features of the claims.

Surprisingly it has now been found that by adding at least one fluoroorganyl-substituted silicon compound, more particularly a fluoroorganyl-substituted silane and/or fluoroorganyl-substituted siloxane, to a curable mixture, as for example to a hydraulically setting mixture, more particularly to an otherwise conventional concrete mixture or to a mortar, it is possible to obtain comprehensive and therefore durable "easy-to-clean" properties in a cured material which is produced from the mixture or mortar and which may optionally have undergone hydraulic setting.

The present invention accordingly provides a curable mixture suitable for obtaining "easy-to-clean" properties in the cured mixture and comprising
  at least one mineral binder,
  a powder comprising at least one fluoroorganyl-substituted silicon compound encapsulated in a water-soluble polymer, the amount of the fluoroorganyl-substituted silicon compound being 0.001% to 8% by weight, based on the present mixture, and optionally further additives.

The quantity figures for the components used relate—unless otherwise indicated—to the sum of the components present in the respective mixture; they are given in % by weight and, in addition, they add up to 100% by weight. In the context of the present invention, the term "curable mixture" is understood to encompass a curable composition as well.

It has surprisingly been observed that the mixture according to the invention possesses outstanding "easy-to-clean" properties even with very small amounts of a fluoroorganyl-substituted silicon compound. The powder used here, and hence the fluoroorganyl-substituted silicon compound, is distributed homogeneously throughout the body of the curable mixture, and so the whole of the subsequently cured body is not only hydrophobized but also oleophobized. This is important especially when the surface becomes damaged as a result, for example, of abrasion or of cracks. It has been found, moreover, that the mixture according to the invention exhibits good adhesion of a wide variety of substrates, in spite of the pronounced hydrophobic and oleophobic properties, contrary to the expectations of the skilled person.

Silanes often have a plasticizing effect on preparations. An advantage of the curable mixture of the invention comprising a powder comprising at least one fluoroorganyl-substituted silicon compound is that, surprisingly, the green solidity is not adversely affected. Accordingly, there is no influence, or no substantial influence, on the yield point of the curable mixture mixed with water from using the fluoroorganyl-substituted silicon compounds.

The invention also provides a method for producing the curable mixture of the invention, comprising the step of mixing at least one powder comprising at least one fluoroorganyl-substituted silicon compound, which is encapsulated in a water-soluble polymer, with at least one component of the curable mixture. After the mixture has cured, it has all advantageous "easy-to-clean" properties throughout its body, and not only on the surface.

It was surprising that the fluoroorganyl-substituted silicon compound can on the one hand be dispersed by known methods and materials in a liquid to form stable mixtures. Accordingly it is possible to obtain emulsions, also called dispersions in the context of the invention, which optionally may also have an extremely small particle size of, for example, significantly less than 2 µm (volume average). On the other hand it could not have been expected that the stabilization of the fluoroorganyl-substituted silicon compound, dispersed in a liquid, in the curable mixture would be sufficiently stable to be mixed effectively with the other components of the curable mixture, but sufficiently unstable so as to break, allowing the fluoroorganyl-substituted silicon compound to hydrolyze and subsequently undergo further reaction, condensation for example, in order thus to obtain the desired "easy-to-clean" properties in a cured mixture.

Indeed, to obtain the desired "easy-to-clean" properties in the cured mixture, it is necessary for a wide variety of complex processes and reactions to proceed at the right time. Thus it is assumed that on the one hand the fluoroorganyl-substituted silicon compound must be distributed homogeneously throughout the matrix of the curable mixture. If the silicon compound is dispersed in a liquid and if it is metered in this form, the dispersion is to be sufficiently stable that it does not break immediately or too late—but instead at the correct time—and release the silicon compound, more particularly hydrolyzable silicon compounds, such as silicon compounds containing alkoxy groups. If, moreover, the fluoroorganyl-substituted silicon compound is present in the form of a powder, more particularly a water-redispersible powder, and if it is metered in this form, the individual dispersion particles are able advantageously to redisperse before the aforementioned processes proceed at the right time. In order to achieve the desired "easy-to-clean" effect in the cured mixture, the skilled person expects—without being tied to any theory—that the sum total of these processes must proceed in the correct sequence and must be substantially concluded before the beginning of the curing of the curable mixture and the associated solidification of the mixture. It is not possible, however, to intervene to regulate these complex processes while they are proceeding.

Thus it was surprising for the skilled worker that the kinetics of these various processes behave in such an optimal way that even very small amounts of a fluoroorganyl-substituted silicon compound exhibit outstanding "easy-to-clean" properties. This is all the more surprising since the materials properties, such as the interfacial tension, for example, of fluoroorganyl-substituted silicon compounds differ substantially from those of other silicon compounds, owing to the fluorine substitution.

Furthermore, the high ionogenicity and alkalinity, such as occur more particularly in the case of aqueous curable mixtures based on a binder—a hydraulically setting binder, for example—as in the case of aqueous cementitious systems, exert a strong influence on stability of such dispersions. In spite of this, outstanding "easy-to-clean" properties are obtained not only on the surface of the cured mixture, but also within the mixture itself.

Also claimed is the use of a fluoroorganyl-substituted silicon compound which is encapsulated in a water-soluble polymer in a hydraulically curable mixture comprising 2% to 60%, preferably 6% to 25%, more preferably 10% to 20%, very preferably 18% by weight of cement, 30% to 90%, preferably 50% to 90%, more preferably 65% to 85%, very preferably 70% to 80% by weight of at least one aggregate, 0.001% to 8%, preferably 0.01% to 6%, more preferably 0.02% to 5%, very preferably 0.05% to 2% by weight of the fluoroorganyl-substituted silicon compound, and optionally of further auxiliaries, in order to obtain "easy-to-clean" properties in the cured mixture. The above figures in % by weight are based in each case on the present mixture.

The fluoroorganyl-substituted silicon compound which is encapsulated in a water-soluble polymer is preferably in the form of a powder and is therefore used preferably as a powder in the curable mixture. If the powder is redispersible in water, it is also possible to use the corresponding aqueous redispersion, which forms an aqueous emulsion, as a component of the curable mixture. Accordingly it is also an intermediate in the production of the powder. Where the powder is obtained by drying an emulsion or dispersion—an aqueous emulsion or dispersion, for example—it is also possible, moreover, for the corresponding emulsion or dispersion to be used directly as a component of the curable mixture. Such emulsions or dispersions are generally obtained if the water-soluble polymer and the fluoroorganyl-substituted silicon compound encapsulated therein form particles—or droplets. Such particles are preferably emulsifiable, dispersible and/or redispersible in water. Irrespective of whether the intermediate, the powder of the invention produced from it, or the redispersion of the water-redispersed powder is used in the curable mixture or in the method for producing such a mixture, the equally advantageous "easy-to-clean" properties are always obtained in the cured mixture.

Surprisingly, the use of the powder in a curable mixture, more particularly in a hydraulically curable mixture, does not show any negative properties. The powder can be used in the known formulas without having to make substantial formula adjustments. Thus, for example, the wettability, the processability, the water requirement for obtaining the same consistency, and the hydration are retained unchanged or are even improved.

The invention also provides a water-redispersible powder and the use thereof, which can be used in mixtures, methods and the use of the curable mixture, and is suitable for obtaining "easy-to-clean" properties in the cured mixture, comprising a water-soluble polymer having one or more organic and/or fluoroorganyl-substituted silicon compounds, which are distributed in the water-soluble polymer, with at least one organic silicon compound being wholly or partly fluorinated.

Also claimed, furthermore, is a method for producing the powder of the invention, in which
water,
at least one water-soluble polymer,
at least one water-insoluble fluoroorganyl-substituted silicon compound, and
optionally further additives are mixed to an intermediate at a pH between 4 and 9, preferably between 4.5 and 8.5, more particularly between 5 and 8, and this intermediate is subsequently dried, the drying taking place preferably by spray drying.

The object referred to at the outset can be achieved in a particularly surprising and particularly advantageous way if the for generating the permanent or comprehensive "easy-to-clean" properties that are desired in the substrate and/or building material is introduced by the homogeneous incorporation of the powder of the invention, which comprises a fluoroorganyl-substituted silicon compound, into the dry building mixture itself or during the preparation of a curable building mixture, more particularly prior to the addition of water. Accordingly, a fluoroorganyl-substituted silicon compound used in accordance with the invention may be stored advantageously in free-flowing form and storage-stably up until the time of application and, furthermore, can be handled easily and with no problems, as for example when being dispensed into bags, during transport, during weighing, and during metering. In particular, as a result, the fluoroorganyl-substituted silicon compounds used in accordance with the invention are also protected from incipient hydrolysis, since the droplets comprising the fluoroorganyl-substituted silicon compound are enveloped or encapsulated by the water-soluble polymer. Hence they are able to develop their particular effect in the curable mixture, a building material mixture, for example, more particularly in the case of hydraulically setting mixtures, preferably cementitious mixtures, e.g., concrete mixtures, as a homogeneously distributed component, in conjunction with mixing water and with the alkaline pH that prevails at this point, with hydrolysis of the fluoroorganylalkoxy-substituted silicon compounds used, and reaction with the components present in the building material mixture, then occurring. A cured material obtainable in this way exhibits, advantageously, the desired body modification, more particularly an effective body hydrophobization and body oleophobization, hence producing comprehensive and permanent, and more particularly homogeneous, "easy-to-clean" properties.

The powder of the invention can be produced, surprisingly, with known methods and materials. A particular advantage of powder, i.e., of powders comprising fluoroorganyl-substituted silicon compounds, is that they allow particularly homogeneous dry mixtures and preparation of particularly homogeneous mixtures to be produced, at the plant, which need merely be stirred with water on site. The cured mixtures produced according to this embodiment likewise exhibit the advantageous "easy-to-clean" properties.

Furthermore, the powder of the invention is notable for good blocking stability and storage stability—that is, the fluoroorganyl-substituted silicon compound is encapsulated sufficiently so that it evaporates neither during the production of the powder nor during its storage, and the powder remains free-flowing. Moreover, the powder, particularly as part of the curable mixture, exhibits outstanding wetting on mixing with water and exhibits subsequent good processing properties—that is, the hydrophobic and oleophobic properties become apparent only after the mixture has cured. If a monomeric compound having alkoxy groups, such as a fluoroalkylalkoxysilane, for example, is used, said silicon compound lies typically unhydrolyzed in the powder of the invention and in monomeric form; in other words, not more than 10%, more particularly not more than 5%, of the alkoxy groups present in the silicon compound are hydrolyzed. This allows the reactive groups to be retained, more particularly the alkoxy groups, during the production and storage of the powder of the invention and the mixing thereof of the curable mixture—provided no water is used during the production of the mixture. After addition of and mixing with water, the alkoxy groups are then hydrolyzed, with the subsequent further reactions producing the desired, advantageous properties.

The curable mixture of the invention comprises more particularly concrete-based mixtures and mortars. Concrete-based mixtures are understood by the skilled person to be dry concrete mixtures, concrete mixed up with water, and cured concrete, referred to collectively below as concrete. Concrete comprises aggregates having a diameter of 3 mm and larger, up to 64 mm. Mortars comprise aggregates, also called fillers, having a diameter of 0.005 to 5 mm, more particularly of 0.01 to 3 mm. They may take the form of dry mortars, pasty mortars, and mortars with two or more components. Dry mortars are often preferred, especially when all of the components are in solid form, as powders preferably. In that case the dry mortars can be premixed at the plant, and then need only be mixed with water and applied on the construction site. Pasty mortars are preferred when no hydraulic binders are present and when fully premixed systems are desired which also already contain the required water fraction. Mortars with two or more components are systems which consist on the one hand of a solid component, containing, for example, all of the pulverulent components, and of one or more liquid and/or viscose components. The liquid component generally includes the aqueous phase comprising the liquid formula components.

Aggregates in a mixture according to the invention may be, for example, rock particle size fractions according to EN 206-1:2000. More particularly, aggregates may be aggregates, sands, gravels, grits, porphyry, quartz flour, ground limestone and ground rock or mixtures thereof, but also fly-ashes, microsilica and other silicatic additives or mixtures thereof. Sands here may be silica sands or river sands, for example. Preference is given to gravels, grits, crushed sands, porphyry, quartz flour, ground limestone and ground rock or mixtures thereof. Thus a mixture according to the invention may advantageously include aggregates which preferably have a maximum particle size of 8 to 63 mm, more preferably of 8 mm, 16 mm, 32 mm or 63 mm, particularly aggregates having a maximum particle size of 32 mm, in accordance with the provisions of DIN 1045-2. It is particularly preferred if the aggregate or aggregates is/are an aggregate having a maximum particle size of 32 mm and/or sand having a maximum particle size of 5 mm.

A mixture according to the invention can generally be produced in a simple and economical way by combining and mixing the components according to the claims. A mixture according to the invention may typically be admixed with water and mixed in a mixing apparatus.

Accordingly, in general, it is possible first of all to prepare a curable mixture, advantageously, by mixing the components according to the present main claim. This curable mixture, if it is then combined on application with an as-claimed amount of water, can be admixed with further components, already listed above, optionally with thorough mixing with and/or in devices and/or containers that are known per se to the skilled person, and the resultant mixture or composition, or a material produced in this way, can be brought into a desired shape and allowed to hydraulically set or harden.

The mineral binder preferably comprises at least a) a hydraulically setting binder, more particularly cement, b) a latent hydraulic binder, more particularly acidic blast furnace slags, pozzolans and/or metakaolin, and/or c) a nonhydraulic binder which reacts under the influence of air and water, more particularly calcium hydroxide and/or calcium oxide. A preferred hydraulically setting binder a) is cement, more particularly Portland cement, Portland composite cement, blast furnace cement, calcium sulfoaluminate cement, pozzolanic cement, i.e., cement with fractions of pozzolans, composite cement, in accordance for example with EN 196 CEM I, II, III, IV and V, and/or fused alumina cement, also called aluminate cement.

As latent hydraulic binders b) it is possible to use pozzolans, such as metakaolin, calcium metasilicate and/or vulcanic slags, vulcanic tuff, trass, flyash, blast furnace slags, air-cooled slags, burnt shale, diatomaceous earth, molar, rice husk ash, fumed silica, microsilica and/or silica dust, which react hydraulically together with a calcium source, such as calcium hydroxide and/or cement.

As nonhydraulic binder c) which reacts under the influence of air and water it is possible in particular to use calcium sulfate in the form of alpha- and/or beta-hemihydrate and/or anhydrite, and also lime, mostly in the form of calcium hydroxide and/or calcium oxide.

A preferred mineral binder is at least one hydraulically setting binder selected from the group of the cements, Portland cements, composite cements, cements with fractions of pozzolans, and blast furnace cements, and more particularly pure Portland cement-based systems or a mixture of Portland cement, fused alumina cement and calcium sulfate, it being possible in the case of both systems, optionally, for latent hydraulic and/or nonhydraulic binders to be added as well.

Preferred mineral binders are hydraulically setting binders, with very particular preference being given to cement, more particularly Portland cement, composite cement, blast furnace cement, and calcium sulfoaluminate cement.

In one preferred embodiment of the present invention the only silicon compounds used are fluoroorganyl-substituted silicon compounds. In another preferred embodiment, fluoroorganyl-substituted silicon compounds are used together with unsubstituted silicon compounds or with silicon compounds which do not possess any fluorine but instead possess one or more substituents other than fluorine. Nonlimiting examples are aminoalkylalkoxysilanes or alkylalkoxysilanes, as for example octyltriethoxysilane. It is possible here to set any mixing ratio, it being noted that the desired "easy-to-clean" properties are achieved only with a quantity of fluoroorganyl-substituted silicon compounds that is adapted to the formula and application.

Fluoroorganyl-substituted silicon compounds according to the invention can be (i) compounds which are derived from the general formulae I, II, III, IV and/or V and can have crosslinking structural elements which form chainlike, cyclic, crosslinked and/or three-dimensionally crosslinked structures, where at least one structure in idealized form corresponds to the general formula I, $$(HO)[(HO)_{1-x}(R^2)_x Si(A)O]_a [Si(B)(R^3)_y (OH)_{1-y} O]_b [Si(C)(R^5)_u (OH)_{1-u} O]_c [Si(D)(OH)O]_d H (HX)_e \quad (I),$$

where, in formula I, the structural elements are derived from alkoxysilane of the general formulae II, III, IV and/or V and A corresponds to an aminoalkyl radical $H_2N(CH_2)_f(NH)_g(CH_2)_h(NH)_m(R^7)_n$— in the structural element derived from the general formula II,

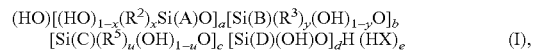

where f is an integer between 0 and 6, where g=0 when f=0 and g=1 when f>0, h is an integer between 0 and 6, x=0 or 1, m=0 or 1 and n=0 or 1, where n+m=0 or 2 in formula II, and $R^7$ is a linear, branched or cyclic divalent alkyl group having from 1 to 16 carbon atoms, B corresponds to a fluoroalkyl radical $R^4$—Y—$(CH_2)_k$— in the structural element derived from the general formula III,

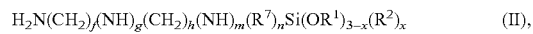

where $R^4$ is a monofluorinated, oligofluorinated or perfluorinated alkyl group having from 1 to 9 carbon atoms or a monofluorinated, oligofluorinated or perfluorinated aryl group, Y is a $CH_2$, O or S group, $R^3$ is a linear, branched or cyclic alkyl group having from 1 to 8 carbon atoms or an aryl group, k=0, 1 or 2 and y=0 or 1 in formula III and/or VI, $R^4$ is preferably $F_3C(CF_2)_r$—, where r=0 to 18, preferably r=5, where Y is a $CH_2$ or O group, and k is preferably 1 with Y=—$CH_2$—, C corresponds to an alkyl radical $R^5$— in the structural element derived from the general formula IV,

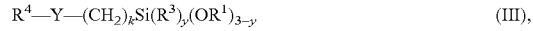

where $R^5$ is a linear or branched alkyl group having from 1 to 4 carbon atoms, in particular methyl, and u=0 or 1 in formula IV, D corresponds to an alkyl radical $R^6$— in the structural element derived from the general formula IV,

where $R^6$ in the abovementioned formulae is a linear, branched or cyclic alkyl group having from 1 to 8 carbon atoms and the radicals $R^1$ in the formulae II, III, IV, V and/or VI are each, independently of one another, a linear, branched or cyclic alkyl group having from 1 to 8 carbon atoms or an aryl group, and $R^1$ is preferably, independently, methyl, ethyl or propyl; where $R^2$, $R^3$ and/or $R^5$ in the abovementioned formulae each correspond, independently of one another, to a linear or branched alkyl radical having from 1 to 4 carbon atoms, preferably independently of one another methyl or ethyl, and in formula (I), HX is an acid, where X is an inorganic or organic acid radical, where x, y and u are each, independently of one another, 0 or 1 and a, b, c, d and e are each, independently of one another, integers where a≥0, b≥0, c≥0, d≥0, e≥0 and (a+b+c+d)≥2, preferably (a+b+c+d)≥4, more preferably (a+b+c+d)≥10, where X is, for example, chloride, nitrate, formate or acetate, or (ii) compounds in which the organosiloxanes are cocondensates or block cocondensates or mixtures of these derived from at least two of the abovementioned alkoxysilanes of the general formulae II, III, IV and V, preferably derived in a molar ratio of 1:≤3.5 from the formulae II and III or else where a, b, c and d in the mole of the alkoxysilanes of the formulae II, III, IV and V with a molar ratio of 0.1≤[a/b+c+d], in particular 0.25≤[a/b+c+d]≤6000, preferably 1≤[a/b+c+d]≤ 3 where a>0, b>0, c≥0 and d≥0,
or (iii) monomeric fluoroorganyl-substituted silicon compounds of the general formula VI

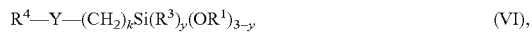

$$R^4-Y-(CH_2)_k Si(R^3)_y (OR^1)_{3-y} \qquad (VI),$$

where $R^4$, Y, $R^1$, $R^3$, k and y are as defined above, and/or mixtures of a plurality of monomeric compounds of the general formula VI.

Preferred curable mixtures are those where the fluoroorganyl-substituted silicon compound is selected from the group of fluoroorganyl-substituted silanes and fluoroorganyl-substituted siloxanes and fluoroorganyl-substituted silicones or a mixture thereof, more particularly where silicon compounds are selected from the group of fluoroalkyl-substituted siloxanes or monomeric fluoroalkyl-substituted silanes, more particularly fluoroalkyl-substituted siloxanes which carry alkoxy and/or hydroxyl groups, or monomeric fluoroalkyl-substituted alkoxysilanes, or mixtures thereof, with very particular preference. In one preferred embodiment the mixture according to the invention comprises as fluoroorganyl-substituted silicon compound a fluoroalkylalkoxysilane of the formula (VII)

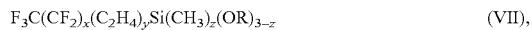

$$F_3C(CF_2)_x(C_2H_4)_y Si(CH_3)_z(OR)_{3-z} \qquad (VII),$$

in which each R independently of any other is selected from the group consisting of methyl, ethyl, n-propyl and isopropyl, x is an integer having a value of 0 to 16, y=0 or 1, and z=0 or 1, preferably y=1, and very preferably y=1, z=0 and x=4, 6, 8 or 10.

Preferred but nonlimiting examples of fluoroalkylalkoxysilane of the formula (VII) are tridecafluoro-1,1,2,2-tetrahydrooctyltriethoxysilane and/or tridecafluoro-1,1,2,2-tetrahydrooctyltrimethoxysilane.

The fluoroorganyl-substituted silicon compounds used in accordance with the invention are as a general rule insoluble in water, i.e., less than 0.1%, preferably less than 0.01%, by weight of the silicon compound dissolves in water at 20° C. and a pH of 5, and they are preferably selected from the group of the fluoroorganyl-substituted silanes and fluoroorganyl-substituted siloxanes or mixtures thereof. More particularly they are preferably selected from the group of the fluoroalkyl-substituted, monomeric silanes and fluoroalkyl-substituted siloxanes or mixtures thereof. An example of a fluoroalkyl-substituted silane is 3,3,4,4,5,5,6,6,7,7,8,8-tridecafluorooctyltriethoxysilane.

Especially preferred fluoroorganyl-substituted silicon compounds are selected from the group of fluoroorganyl-substituted silanes and fluoroorganyl-substituted siloxanes, more particularly fluoroalkyl-substituted monosilanes and monosiloxanes, or mixtures thereof. Mixtures also include mixtures of fluoroorganyl-substituted silicon compounds with other silicon compounds not fluorine-substituted, more particularly mixtures of fluoroorganyl-substituted silicon compounds of formula (VII) and $C_1$-$C_{16}$ alkylalkoxysilanes, with preferred alkoxy groups being methoxy, ethoxy and propoxy groups and preferred alkyl groups being methyl, ethyl, propyl, butyl, pentyl, hexyl, heptyl, octyl and hexadecyl groups. Where mixtures with non-fluorine-substituted silicon compounds are used, the fraction of the fluoroorganyl-substituted silicon compounds is preferably at least 25% by weight, more particularly at least 50% by weight, and very preferably at least 75% by weight, based on the total amount of the silicon compound used.

The fluoroorganyl-substituted silicon compounds which are present in the powder, in the intermediate and/or in the emulsion obtained by redispersion may be separated from the powder, intermediate or emulsion, respectively, by extraction with a suitable solvent, as for example with methylene chloride ($CH_2Cl_2$), and the amount thereof determined quantitatively. The solution obtained can be subsequently analyzed by GC/MS and/or by NMR, and in this way the fraction of hydrolyzed alkoxy groups can be determined as well. Particularly suitable for the NMR spectroscopy are $^{29}$Si NMR and $^{19}$F NMR. Optionally it is also possible to employ $^1$H and/or $^{13}$C NMR spectroscopy. These methods are known to the skilled person.

Where the fluoroorganyl-substituted silicon compound is present in the cured mixture, it can be analyzed using, for example, the method described in EP 0 741 293 A2.

Suitable water-soluble polymers are preferably compounds of relatively high molecular mass, i.e., polymers having 20 or more monomer units. These polymers are generally in solid form at room temperature.

Suitable water-soluble polymers are biopolymers such as proteins and polysaccharides, which optionally have been chemically modified, synthetic oligomers of relatively high molecular mass, i.e., oligomers of 4 to 19 or more monomer units, and also nonionic or weakly ionic polymers. It is possible to use only one polymer or a polymer mixture. Often it is advantageous if the polymer contains only a small fraction of carboxyl groups or is entirely nonionic.

Biopolymers which can be employed with preference are polysaccharides and derivatives thereof are cold-water-soluble polysaccharides and polysaccharide ethers, such as cellulose ethers, starch ethers (amylose and/or amylopectin and/or derivatives thereof), guar ethers and/or dextrins. It is also possible to use synthetic polysaccharides, such as anionic, nonionic or cationic heteropolysaccharides, more particularly xanthan gum or wellan gum. The polysaccharides may be but need not be chemically modified, with, for example, carboxymethyl, carboxyethyl, hydroxyethyl, hydroxypropyl, methyl, ethyl, propyl, sulfate, phosphate and/or long-chain alkyl groups. Other natural stabilizing systems are alginates, peptides and/or proteins such as, for example, gelatin, casein and/or soya protein. Especially preferred are dextrins, starch, starch ethers, casein, soya protein, gelatin, hydroxyalkylcellulose and/or alkylhydroxyalkylcellulose.

Suitable synthetically prepared water-soluble polymers, sometimes also known by the term protective colloids, are vinyl polymers, formaldehyde condensates, and alkylene oxide polymers. They may be used alone or in combination with other synthetic and/or natural polymers.

Nonlimiting examples of vinyl polymers are one or more polyvinylpyrrolidones and/or polyvinylacetals having weight-average molecular weights Mw of 2000 to 400 000, fully or partly hydrolyzed polyvinyl alcohols and/or polyvinyl alcohols modified with amino groups, carboxylic acid groups and/or alkyl groups, having a degree of hydrolysis of preferably about 70 to 100 mol %, more particularly of about 80 to 98 mol %, and having a Höppler viscosity in 4% strength aqueous solution of preferably 1 to 50 mPa s, more particularly of about 3 to 40 mPa s (measured at 20° C. in accordance with DIN 53015), styrene-maleic acid copolymers and/or vinyl ether-maleic acid copolymers. Nonlimiting examples of formaldehyde condensates are melamine-formaldehyde sulfonates and naphthalene-formaldehyde sulfonates. Nonlimiting examples of alkylene oxide polymers are homopolymers of propylene oxide and ethylene oxide and also their block copolymers.

Especially preferred are synthetic stabilizing systems, more particularly partly hydrolyzed, optionally modified polyvinyl alcohols, it being possible for one or more polyvinyl alcohols to be used together, optionally with small amounts of suitable emulsifiers. Preferred synthetic stabilizing systems are, in particular, modified and/or nonmodified polyvinyl alcohols having a degree of hydrolysis of 80 to 98 mol % and a Hëppler viscosity as a 4% strength aqueous solution of 1 to 50 mPa s and/or polyvinylpyrrolidone.

It is also possible that in the case of a mixture according to the invention, two or more water-soluble polymers are used, optionally in combination with one or more emulsifiers. Suitable emulsifiers are known to the skilled person. It is possible, for example, to use a combination of one or more natural compounds with one or more synthetically prepared compounds, or a combination of one or more natural or synthetically prepared compounds.

For this purpose, for example, suitable emulsions and/or dispersions are converted by drying into the water-redispersible powder of the invention. In the sense of this invention, the term "powder" also represents granules and flakes. The powders of the invention are preferably free-flowing and they redisperse in water. This takes place spontaneously or by gentle circulatory stirring, with the original particle size or droplet size being regained, at least approximately. The emulsion, dispersion or redispersion is stable in water—that is, even after weeks or even after months, there is generally no breaking or settling, or sedimentation, of the particles.

It is noted that in EP-A-1 982 964 the use is described of a mixture of a water-soluble polymer and an organosilicon compound for the protection of substrates from corrosion. As organosilicon compound it is possible to use a multiplicity of silanes, siloxanes and mixtures of different organosilicon compounds. Among other things it is also said that fluoroalkyl-functional alkoxysilanes may be used.

Moreover, water-dispersible and -redispersible mixtures comprising water-soluble polymers and at least one organosilicon compound, based on an Si—O—Si compound or on a specific oligomer mixture of alkylalkoxysiloxanes, are described. The use of such mixtures for "easy-to-clean" applications is not stated or suggested. Moreover, in particular, the embodiments described in the examples are not suitable for obtaining dirt-repellent materials.

In one preferred embodiment first of all an intermediate is prepared in the form of an aqueous dispersion of the fluoroorganyl-substituted silicon compound, the dispersants used being water-soluble polymers, more particularly synthetic polymers such as polyvinyl alcohol, for example. For this purpose, preferably, the water-soluble polymer is dissolved in water, as a preliminary, and then the solution is mixed with the fluoroorganyl-substituted silicon compound, by means for example of dispersing, in the course of which it is possible optionally for further additives, also called auxiliaries, to be added. Such methods are known to the skilled person. The intermediate can be subsequently dried, in which case, optionally, further additives, such as fillers, for example, may be admixed before, during and/or after the drying operation. This produces freely flowing, and hence readily free-flowable, water-redispersible powders, i.e., powders of the invention, which are notable for outstanding wettability and redispersibility in water. Accordingly, the fluoroorganyl-substituted silicon compound thus encapsulated possesses an excellent storage stability in the intermediate and in the powder. Nevertheless, in an alkaline medium, preferably during the curing of the mineral binder, the fluoroorganyl-substituted silicon compound undergoes hydrolysis with sufficient rapidity for the advantageous "easy-to-clean" properties to be obtained.

The terms emulsion and dispersion, and also emulsifying and dispersing, are also used as synonyms in the context of this invention.

The fraction of the fluoroorganyl-substituted silicon compound in the powder of the invention is generally about 2.5% to 90% by weight, preferably about 5% 80% by weight, more preferably about 5% to 70% by weight, more particularly about 10% to 60% by weight, based on the powder.

Drying takes place preferably by means of spray drying, freeze drying, fluidized bed drying, roll drying, granulating or fast drying, with spray drying being particularly preferred. Spraying takes place by means for example of a spraying wheel or single-fluid or multifluid nozzle. During and/or after the drying it is possible to add further auxiliaries such as antiblocking agents and/or fillers. Nonlimiting examples are aluminum silicates, colloidal silicon dioxide gel, pyrogenically produced silicon dioxide, ground clays, perlites, vermiculites, light spar, talc, cements, chalk powders, mixed calcium/magnesium carbonates and/or diatomaceous earth.

If necessary, the aqueous dispersion, i.e., the intermediate, may for this purpose also be diluted with water, in order to obtain a viscosity suitable for the drying operation. The drying temperature is in general not to exceed about 250° C., more particularly about 200° C., on the basis of safety considerations. In order to obtain sufficiently efficient drying, temperatures of about 110° C. or more, more preferably about 120° C. or more, are preferred. The exit temperature of the gas stream is generally about 40° C. to 100° C., more particularly about 50° C. to 90° C.

In one preferred embodiment the powder of the invention comprises as fluoroorganyl-substituted silicon compound the fluoroalkylalkoxysilane of the formula (VII)

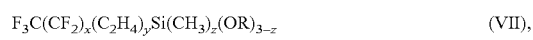

$$F_3C(CF_2)_x(C_2H_4)_ySi(CH_3)_z(OR)_{3-z} \quad (VII),$$

in which each R independently of any other is selected from the group consisting of methyl, ethyl, n-propyl and isopropyl, x is an integer having a value of 0 to 16, y=0 or 1, and z=0 or 1, preferably y=1, and very preferably y=1, z=0 and x=4, 6, 8 or 10.

Examples of fluoroalkylalkoxysilane of the formula (VII) that are preferred for this embodiment but are nonlimiting are tridecafluoro-1,1,2,2-tetrahydrooctyltriethoxysilane and/or tridecafluoro-1,1,2,2-tetrahydrooctyltrimethoxysilane.

Where the fluoroorganyl-substituted silicon compound is dispersed in a liquid in a known way by means of water-soluble polymers, the weight ratio of the respective silicon compound used to the water-soluble polymers may be for example from about 95:5 to 5:95, preferably from about 85:15 to 15:85, more particularly from about 70:30 to 30:70, and very preferably from about 60:40 to 40:60.

It is particularly preferred if they are present in a free-flowable, pulverulent form and are dispersible in water. It has been found that in that case the substances can be incorporated particularly well and homogeneously in the mixture according to the invention.

For the purposes of this invention, "free-flowable" means that such materials are freely flowing. The free-flowability can be measured using the Dr. Pfrengle pourability tester (available from Karg-Industrietechnik, for example) in accordance with ISO 4342. Accordingly, a defined amount of powder is scattered through a defined opening on to a slightly rough surface. By measuring the height of the resultant cone it is possible to determine the angle of repose on the basis of a reference table. The lower the angle of repose, the better the free-flowability. For free-flowable powders an angle of repose of between 5° and 70°, more particularly between 5° and 60°, is preferred.

In one embodiment according to the invention, the fluoroorganyl-substituted silicon compound is encapsulated in a water-soluble polymer, with the water-soluble polymer and the silicon compound forming particles which are dispersible and/or redispersible in water. The water-soluble polymer is preferably selected from the group of polysaccharides, polysaccharide ethers, proteins, vinyl polymers, formaldehyde condensates and alkylene oxide polymers.

In a powder of the invention and also in a corresponding curable (dry) mixture according to the invention, the fluoroorganylalkoxy-substituted silicon compound, which is preferably in liquid form at room temperature and which is encapsulated in a water-soluble polymer and in that case may be present in the form of droplets, may have an average droplet size of up to 10 µm, preferably from 10 nm to 10 µm, more preferably from 20 nm to 5 µm, more particularly from 50 nm to 2 µm. Furthermore, the fluoroorganylalkoxy-substituted silicon compound is substantially unhydrolyzed, meaning that less than 10%, more particularly less than 5%, of the alkoxy groups bonded on the silicon are hydrolyzed. The droplet size in the powder can be determined by means of microscropy, preferably by means of electron microscopy, and is reported as average diameter.

Depending on the drying method, the average particle size of the powder of the invention is typically, approximately, from about 20 µm to about 5 mm, more particularly from about 50 µm to about 2 mm. Where the powder of the invention is produced by spray drying, the particle size is generally not more than 500 µm, preferably not more than 300 µm. The resultant powders redisperse in water generally spontaneously or by gentle circulatory stirring, with the original particle size being regained, advantageously.

The particle size and/or droplet size can be determined by the usual measurement methods, with light diffraction being particularly preferred both for dispersions and for powders. These methods are known to the skilled person. The particle size is reported as the volume average.

In one preferred embodiment, the silicon compound used in accordance with the invention is present substantially in unhydrolyzed form. In the context of use in accordance with the invention, the hydrolysis of the fluoroorganylalkoxy-substituted silicon compound takes place more particularly at an alkaline pH, as for example after mixing of a cementitious mixture with water.

A mixture according to the invention may comprise customary additives, more particularly aggregates of the kind already set out on page 12 of the present description, or fillers and also auxiliaries, also called assistants.

Suitable assistants are selected from organic or inorganic acids, buffer substances, fungicides, bactericides, algicides, microbiocides, odorants, corrosion inhibitors, such as alkylammonium benzoates, amino alcohols, gluconic acid and/or its alkali metal salts and alkaline earth metal salts, preservatives, rheological assistants, hydrophobizing agents, such as fatty acids and also their salts and esters, fatty alcohols, silanes, air pore formers, wetting agents, defoamers, emulsifiers, film-forming assistants, setting and solidification accelerators, setting retarders, thickeners, dispersants, rheology control additives, such as cement plasticizers, polycarboxylates, polycarboxylate ethers, polyacrylamides and/or thickeners, water retention agents, cellulose fibers and cellulose ethers, starch ethers, guar ethers, additives for reducing efflorescence, sedimentation and/or bleaching, shrinkage reduction assistants, pigments, and, if the mixture is in powder form, assistants for the reduction of powder blocking.

Further suitable additives, more particularly fillers, are for example—but not exclusively—quartzitic and/or carbonatic sands and/or flours, such as, for example, silica sand and/or ground limestone, carbonates, silicates, phyllosilicates, precipitated silicas, lightweight fillers such as hollow microspheres made of glass or polymers such as polystyrene beads, aluminosilicates, silicon oxide, aluminum silicon oxide, calcium silicate hydrate, silicon dioxide, aluminum silicate, magnesium silicate, aluminum silicate hydrate, calcium aluminum silicate, calcium silicate hydrate, aluminum iron magnesium silicate, calcium metasilicate and/or vulcanic slags, pozzolans such as metakaolin, latent hydraulic components, silicatic additives such as, for example, microsilica, flyash, fumed silicas, precipitated silicas, zeolites, crystalline silicas, silica sols, kaolin, mica, kieselguhr, diatomaceous earth, talc, wollastonite or clay, or of a mixture of corresponding microsilica, flyash, fumed silicas, precipitated silicas, zeolites, crystalline silicas, silica sols, kaolin, mica, kieselguhr, diatomaceous earth, talc, wollastonite or clay, or of an aqueous dispersion of at least one pyrogenically produced silica or at least one precipitated silica or of a mixture of pyrogenically produced and precipitated silicas.

If the fluoroorganyl-substituted silicon compound used in accordance with the invention is employed as an intermediate or as a redispersion, then the calculation of the entire mixture of the cement-bound mixture is advantageously carried out using only the fraction of active substance in the respective aqueous mixture as fluoroorganyl-substituted silicon compound of the invention. The water content of these aqueous preparations is advantageously included when calculating the necessary amount of water to be added.

The mixture according to the invention consists advantageously of a) 2% to 60% by weight of at least one hydraulic binder, more particularly cement, b) 30% to 90% by weight of at least one aggregate, c) 0.001% to 8% by weight of at least one fluoroorganyl-substituted silicon compound, and optionally d) 0% to 40% by weight of further components, each of the components used adding to 100% by weight, and component c) being present in the form of a powder, an intermediate for producing the powder, or a powder redispersed in water.

The curable mixture according to the invention comprises more particularly concrete and mortar.

Typically there is still water present in the curing mixture of the invention, or water is added to this mixture, in order to allow curing. The amount of water in this case is preferably 1% to 50% by weight. For concrete it is preferred to add 1% to 20% by weight, more particularly 2% to 18% by weight of water, for mortar preferably 15% to 45% by weight, more particularly 17% to 40% by weight of water, based on the mixture, with each of the components used, including the water used, adding up to 100% by weight.

A mixture according to the invention for concrete consists preferably of
  $a_1$) 6% to 25% by weight, preferably 10% to 20%, more particularly 12% to 18% by weight of at least one hydraulic binder, more particularly cement,
  $b_1$) 50% to 90%, preferably 65% to 85%, more particularly 70% to 80% by weight of at least one aggregate,
  $c_1$) 0.001% to 8%, preferably 0.003% to 5%, more preferably 0.005% to 4%, more particularly 0.01% to 3%, very preferably 0.05% to 2% by weight of at least one fluoroorganyl-substituted silicon compound which is encapsulated in a water-soluble polymer and is present in the form of the intermediate, the powder obtained from it or the powder redispersed in water, and optionally 0% to 40% by weight of further components, with each of the components used adding up to 100% by weight.

Provision is made for the general quantity limitations identified under $a_1$), $b_1$) and $c_1$) to be observed in each case, depending on the specific selection of the mixture ingredients.

Furthermore, a hydraulically setting mixture of the invention in the form of a concrete mixture may advantageously comprise, as further components, additionally $d_1$) 0.01% to 2%, preferably 0.05% to 0.5% by weight of plasticizers, and/or $e_1$) 0.01% to 10%, preferably 0.01% to 3%, more particularly 0.01% to 1% by weight of at least one further auxiliary, with each of the components used adding up to 100% by weight.

Plasticizers may be all customary flow assistants, more particularly polycarboxylate ethers (PCEs) and/or polymethyl methacrylates, and also lignosulfonates or naphthalene-formaldehyde-sulfonates.

Hydraulically setting mixtures of the invention may comprise as further assistants or auxiliaries, for example, dispersing assistants and wetting assistants, such as siliconates or alkylphosphonates, for example, defoamers, such as trialkyl phosphates, for example, air pore formers, such as hydrolyzed resin acids, retardants and accelerators, such as formates, for example, and/or water reducers.

Aggregates in a mixture according to the invention may be, for example, rock particle size fractions according to EN 206-1:2000. More particularly, aggregates may be aggregates, sands, gravels, grits, porphyry, quartz flour, ground limestone and ground rock or mixtures thereof, but also fly-ashes, microsilica and other silicatic additives or mixtures thereof. Sands here may be silica sands or river sands, for example. Preference is given to gravels, grits, crushed sands, porphyry, quartz flour, ground limestone and ground rock or mixtures thereof.

Thus a mixture according to the invention may advantageously include aggregates which preferably have a maximum particle size of 8 to 63 mm, more preferably of 8 mm, 16 mm, 32 mm or 63 mm, particularly aggregates having a maximum particle size of 32 mm, in accordance with the provisions of DIN 1045-2. It is particularly preferred if the aggregate or aggregates is/are an aggregate having a maximum particle size of 32 mm and/or sand having a maximum particle size of 5 mm.

The mixture for mortar is dependent on the nature of the binder, more particularly on the nature of the mineral binder, and on the application for which the mortar is optimized. Such mixtures are known to the skilled person.

A mixture for hydraulically setting mortars, more particularly dry mortars, consists preferably of $a_2$) 10% to 50% by weight, preferably 15% to 40% by weight of at least one hydraulic binder, more particularly cement, $b_2$) 20% to 90%, preferably 40% to 85% by weight of at least one aggregate or filler, $c_2$) 0.001% to 8%, preferably 0.003% to 5%, more preferably 0.005% to 4%, more particularly 0.01% to 3%, very preferably 0.05% to 2% by weight of at least one fluoroorganyl-substituted silicon compound which is encapsulated in a water-soluble polymer and is present in the form of the intermediate, the powder obtained from it or the powder redispersed in water, and optionally 0% to 40% by weight of further components, with each of the components used adding up to 100% by weight.

Furthermore, a hydraulically setting mixture according to the invention in the form of a mortar, more particularly in the form of a dry mortar, may advantageously as further components additionally 0.001% to 3% of cellulose ethers and/or cellulose fibers, 0.1% to 40% of a dispersion powder based on a water-insoluble, film-forming polymer, and up to 10% of further auxiliaries, with each of the components used adding up to 100% by weight.

Dispersion powders of this kind are generally redispersible in water and are commonly obtained by drying an aqueous dispersion comprising at least one water-insoluble, film-forming polymer. Aqueous dispersions of this kind are obtained typically by means of emulsion and/or suspension polymerization.

Polymers of this kind are preferably homopolymers or copolymers based on vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene and may optionally contain up to 30% by weight of further, functional monomers. These are known to the skilled person. The minimum film-forming temperature (MFT) may be determined in accordance with DIN 53787 and for applications at room temperature is typically 20° C. or less, preferably 10° C. or less, more particularly 5° C. or less, the lower limit of the MFT in the case of aqueous systems being situated approximately at 0° C., owing to the freezing of the water. These polymers are conventionally stabilized with emulsifiers and/or water-soluble polymers. Aqueous dispersions are generally free of solvent. Water-redispersible powders are produced typically by drying, more particularly by spray drying, of aqueous dispersions which are preferably stabilized with water-soluble polymers. When they come into contact with water, they undergo spontaneous redispersion, or at most redispersion by gentle circulatory stirring. If the aqueous dispersion or the water-redispersible powder is part of a suitable formulation, which may also be free from mineral binder, they are able to form flexible, cured mixtures. Such mixtures, but without the fluoroorganyl-substituted silicon compound and without the desired "easy-to-clean" effect being obtained, are known to the skilled person.

After they have been stirred up with water, the mortars of the invention can be applied to all known surfaces. Preferred, nonlimiting examples are concrete, brick or shingle, wood, render, plaster, screed, leveling compounds, troweling compounds, plasterboard, cement fiberboard, expanded or extruded polystyrene boards, dry construction elements, and/or tiles, more particularly side edges of tiles for jointing mortars.

In one embodiment the curable mixture of the invention is used advantageously as a hydraulically setting mixture in the concrete industry, in which case it is mixed in conventional mechanical mixers.

The procedure in this case may advantageously be to premix the cement and solid aggregates, to premix any liquid, nonaqueous components likewise with the cement, but to add aqueous formulations, such as an inventively used aqueous dispersion, emulsion or redispersion of a fluoroorganyl-substituted silicon compound, together with the mixing water. Formulations in powder form can be advantageously predispersed in the mixing water. The amount of additionally introduced water may advantageously be taken into account when setting the desired water/cement factor, also called w/c value. The processing properties of the mixtures according to the invention are advantageously unchanged by comparison with unmodified mixtures.

It is also possible, however, to place a solids mixture of a curable mixture according to the invention, for example a hydraulically setting mixture, in a mechanical mixer and to add a defined amount of water, all at once or in portions, and to carry out mixing. Alternatively the water may be introduced initially and a premixed solids mixture, such as a dry mortar, for example, may be metered in, with stirring taking place with a conventional mixer. Mixing processes of these kinds are known to the skilled person A resulting curable mixture according to the invention, a hydraulically setting mixture for example, may subsequently be subjected to a shaping and curing procedure known per se to the skilled person, the surfaces thereof advantageously exhibiting, in the sense of the invention, only a relatively low soiling tendency ("easy-to-clean" quality) even in the case of abrasion.

An inventive solids mixture of this kind, of a preferably hydraulically setting mixture, can be obtained, for example, by combining, more particularly for a concrete mixture, cement [component as per feature $a_1$], aggregate [component as per feature $b_1$] and a fluoroorganyl-substituted silicon compound encapsulated with a water-soluble polymer [component as per feature $c_1$] in a mixing vessel, carrying out mixing, introducing the mixture, where necessary, into a transport container, and readying it for application. Furthermore, a solids mixture of this kind may optionally be admixed with plasticizers [component as per feature $d_1$] and/or other auxiliaries [component as per feature $e_1$], provided these components are in powder or free-flowable form. If these components as per $d_1$) and/or $e_1$) happen to be liquid, they can be converted, in a manner familiar to the skilled person, into a pulverulent, preferably free-flowable form, and then admixed to a mixture according to the invention.

For the application of a solids mixture of the invention of this kind (also called mixture for short), it can be mixed in a conventional way with mixing water in a mixer, such as a concrete mixer, for example, and subsequently used.

Furthermore, a resultant hydraulically setting mixture of the invention may be subjected to shaping and curing conventional to the skilled person, the surfaces thereof advantageously exhibiting, in the sense of the invention, a relatively low soiling tendency ("easy-to-clean" quality) even in the case of abrasion.

The present invention accordingly also provides materials, more particularly components, concrete goods or moldings, which are obtainable using a hydraulically setting mixture according to the invention.

Further provided by the present invention is the use of a hydraulically setting mixture of the invention for producing materials, more particularly components, concretes or moldings, whose surface has only a relatively low soiling tendency ("easy-to-clean" quality) even in the case of abrasion.

Likewise provided by the present invention is the use of a fluoroorganyl-substituted silicon compound, more particularly as specified in more detail above, for the body modification of a hydraulically setting mixture, more particularly of a mixture which for concretes comprises preferably 6% to 25% by weight of cement, 50% to 90% by weight of at least one aggregate and 0.001% to 8% by weight of at least one fluoroorganyl-substituted silicon compound and also optionally 1% to 20% by weight of water and/or 0.01 to 2% by weight of plasticizer and/or 0.01% to 1% by weight of at least one further auxiliary, and for dry mortars preferably comprises 10% to 50% by weight of cement, 20% to 90% by weight of at least one aggregate or filler, and 0.001% to 8% by weight of at least one fluoroorganyl-substituted silicon compound, and optionally 0% to 40% by weight of further components, each of the components used adding up to 100% by weight, where the fluoroorganyl-substituted silicon compound is encapsulated in a water-soluble polymer and is present in the form of the powder, the intermediate for its production or the water-redispersed powder.

Accordingly, a hydraulically setting mixture according to the invention can be used advantageously in the construction sector, more particularly for the production of workpieces, for concrete paving slabs, or else as facing concrete, more particularly in facings for paving slabs, with such workpieces being distinguished advantageously by "easy-to-clean" properties.

It should be stated that for the manufacturers of cement-bonded workpieces, more particularly for the manufacturers of concrete slabs, there has to the present day been great interest in lastingly modifying hydraulically setting workpieces, more particularly cement-bonded workpieces, and ensuring "easy-to-clean" properties on the surface in spite of the effects of abrasion and weathering.

The curable mixture according to the invention in the form of a mortar, more particularly a dry mortar, can be used with preference as a jointing mortar, repair mortar, powder paint, adhesive filler, render, more particularly finishing plaster and also gypsum and/or lime and/or cement renders, leveling mortars, troweling compounds, industrial flooring compounds, mortars for bonding bridges, sealing slurries, composite thermal insulation mortars, tile adhesives, and primers, and/or as cement-based compositions for boreholes for petroleum, natural gas and/or geothermal heat.

Through the provision and the use of mixtures according to the invention it is possible, on the basis of the newly acquired "easy-to-clean" properties, which are durable despite abrasion and weathering, in hydraulically hardened workpieces, for distinct reductions to be achieved in cleaning and maintenance costs, as a result of extended cleaning cycles. Body modifications of this kind can be made advantageously in particular in the ongoing operation of a production plant, and the workpieces may be sent out in ready-protected form. Additional work at the construction site is unnecessary.

However, compositions according to the invention can also be produced and used advantageously at an application site.

The invention is illustrated in more detail by means of the following examples, but without restricting the subject matter of the invention. Unless indicated otherwise, the tests were carried out at a temperature of 23° C. and at a relative humidity of 50%.

EXAMPLES

Production of the Powders Used

Example 1

Production of Powder 1 (Comparative Example; P1)

39 g of n-octyltriethoxysilane (manufacturer Evonik Degussa) were dispersed with a propeller stirrer at 1000 rpm for 15 minutes in 560 g of a 25% strength by weight aqueous solution of a polyvinyl alcohol having a degree of hydrolysis of 88 mol % and a Höppler viscosity as a 4% strength solution of 4 mPa s, and then diluted with water to a solids content of 20% by weight. This mixture was sprayed on a laboratory spraying tower with a two-fluid nozzle by means of compressed air, with an inlet temperature of 135° C., and dried. Anticaking agents added were 0.5% by weight of a fumed silica and 10% by weight of a commercial carbonate, based on the completed powder. A good yield was obtained of a free-flowing, blocking-stable white powder which is readily redispersible in water, with no notable instances of soiling being observed in the spraying tower.

Example 2

Production of Powder 2 (P2)

The method for producing powder 1 was repeated, with the silane used being 3,3,4,4,5,5,6,6,7,7,8,8,8-tridecafluorooctyltriethoxysilane (Dynasylan® F 8261). Anticaking agents added were 0.5% by weight of a fumed silica and 10% by weight of a commercial carbonate, based on the completed powder. A good yield was obtained of a free-flowing, blocking-stable white powder which is readily redispersible in water, with no notable instances of soiling being observed in the spraying tower. The powder obtained was not greasy even when rubbed between the fingers. From this it can be concluded that the powder obtained contains the silicon compound used in a well-encapsulated form.

Example 3

Production of Powder 3 (Comparative Example; CP3)

The method for producing powder 1 was repeated, with 100 g of n-octyltriethoxy-silane (manufacturer Evonik Degussa) being dispersed in 320 g of the 25% by weight aqueous polyvinyl alcohol solution. Anticaking agents added were 0.6% by weight of a fumed silica and 9.4% by weight of a commercial carbonate, based on the completed powder. A good yield was obtained of a free-flowing, blocking-stable white powder which is readily redispersible in water, with no notable instances of soiling being observed in the spraying tower.

Example 4

Production of Powder 4 (P4)

The method for producing powder 3 was repeated, with 75 g of n-octyltriethoxysilane (manufacturer: Evonik Degussa) and 25 g of 3,3,4,4,5,5,6,6,7,7,8,8,8-tridecafluorooctyltriethoxysilane (Dynasylan® F 8261) being dispersed in 400 g of the 25% strength by weight aqueous polyvinyl alcohol solution. A good yield was obtained of a free-flowing, blocking-stable white powder which is readily redispersible in water, with no notable instances of soiling being observed in the spraying tower. The powder obtained was not greasy even when rubbed between the fingers. From this it can be concluded that the powder obtained contains the silicon compounds used in a well-encapsulated form.

Example 5

Production of Powder 5 (P5)

The method for producing powder 4 was repeated, with 50 g of n-octyltriethoxysilane (manufacturer: Evonik Degussa) and 50 g of 3,3,4,4,5,5,6,6,7,7,8,8,8-tridecafluorooctyltriethoxysilane (Dynasylan® F 8261) being dispersed in the polyvinyl alcohol solution. A good yield was obtained of a free-flowing, blocking-stable white powder which is readily redispersible in water, with no notable instances of soiling being observed in the spraying tower. The powder obtained was not greasy even when rubbed between the fingers. From this it can be concluded that the powder obtained contains the silicon compounds used in a well-encapsulated form.

Example 6

Production of Powder 6 (P6)

The method for producing powder 4 was repeated, with 25 g of n-octyltriethoxysilane (manufacturer: Evonik Degussa) and 75 g of 3,3,4,4,5,5,6,6,7,7,8,8,8-tridecafluorooctyltriethoxysilane (Dynasylan® F 8261) being dispersed in the polyvinyl alcohol solution. A good yield was obtained of a free-flowing, blocking-stable white powder which is readily redispersible in water, with no notable instances of soiling being observed in the spraying tower. The powder obtained was not greasy even when rubbed between the fingers. From this it can be concluded that the powder obtained contains the silicon compounds used in a well-encapsulated form.

Example 7

Production of Powder 7 (P7)

The method for producing powder 4 was repeated, with 100 g of 3,3,4,4,5,5,6,6,7,7,8,8,8-tridecafluorooctyltriethoxysilane (Dynasylan® F 8261) being dispersed in the polyvinyl alcohol solution. A good yield was obtained of a free-flowing, blocking-stable white powder which is readily redispersible in water, with no notable instances of soiling being observed in the spraying tower. The powder obtained was not greasy even when rubbed between the fingers. From this it can be concluded that the powder obtained contains the silicon compound used in a well-encapsulated form.

Example 8

Determination of the Amount of Silicon Compound in Powder P7

2 samples of powder (P7) were extracted under reflux with dichloromethane. The initial masses and extraction times are given in table 1. The systems were then filtered, and the $CH_2Cl_2$ phase was freed from the solvent on a rotary evaporator. The final mass is likewise given in table 1.

TABLE 1

| Quantitative analysis of the silicon compound used in powder P7 | | |
| --- | --- | --- |
| Initial mass | Extraction time | Final mass/fraction |
| 8.03 g | 2 hours | 4.01 g/49.9% by weight |
| 7.99 g | 6.25 hours | 3.80 g/50.3% by weight |

A $^1$H-NMR and a $^{29}$Si-NMR spectrum were recorded in each case for the residue. The $^1$H- and $^{29}$Si-NMR spectra show that the tridecafluorooctyltriethoxysilane is still in the form of a nonhydrolyzed monomeric silane. No oligomeric fractions were observed. Polyvinyl alcohol could not be detected.

The results from table 1 show that the entire amount of the silicon compound used can be converted by means of spray drying into a water-redispersible powder and that almost all of the tridecafluorooctyltriethoxysilane in the powder is in the form of monomer. Furthermore, the amount of silicon compound used can be extracted fully by means of dichloromethane and can be quantitatively determined.

Production of Test Mortar Specimens
General Procedure For Examples 9 to 16

The test mortar specimens used were prepared from a commercial universal mortar (mortar group II as per DIN V 18580, mortar group P II as per DIN V 18550) from the company Quick-Mix. This was done by intimately stirring 100 g of the mortar with approximately 24 ml of water in each case. The adjuvant listed in each case in the examples was predispersed in the mixing water in each case. The resulting mixture was introduced into PE formwork shells, dried at 25° C. for 24 hours, then removed and cured at 25° C. for a further 28 days. The soiling properties were tested in a method based on DIN EN ISO 10545-14; the test is described in more detail below.

Figures in % by weight are based in each case on the weight of the complete dry mixture.

Example 9

Comparative Example

A test mortar specimen was produced as described above. No adjuvants were used.

Example 10

A test mortar specimen was produced as described above. Before addition, 2% by weight of powder 7 was dispersed in the mixing water.

Example 11

A test mortar specimen was produced as described above. Before addition, 5% by weight of powder 7 was dispersed in the mixing water.

Example 12

Comparative Example

A test mortar specimen was produced as described above. Before addition, 2% by weight of an o/w emulsion containing 50% by weight of an octyltriethoxysilane was dispersed in the mixing water.

Evaluation of the "Easy-to-Clean" properties (Examples 9 to 12)

Applied to the surface of the cured test mortar specimens (not the formwork side) in each case was one drop (approximately 0.5 ml) of the soiling agents coffee (black, sugared, cold), cola, red wine, and olive oil. After an exposure time of 1 hour at 25° C., the surface was padded with a soft cloth and exposed to deionized water for 3 minutes. Finally, the water is padded off with a soft cloth and the soiling of the surface after drying is assessed visually. In this case, 5 means that no instances of soiling are visible, 4 means that instances of soiling are slightly visible, 3 means that instances of soiling are visible, 2 means that instances of soiling are clearly visible, and 1 means that instances of soiling are strongly visible. Good "easy-to-clean" properties can only be said to be present when a distinct improvement is achieved in relation to an untreated control sample. The "easy-to-clean" properties can be said to be very good when the 3 aqueous soiling agents (coffee, cola and red wine) each achieve a 4 or 5 and at the same time olive oil achieves a marked improvement relative to an untreated control sample. Table 2 sets out the results of the soiling test

TABLE 2

Results of the soiling test

| | Soiling with | | | |
|---|---|---|---|---|
| Example | Coffee (sugared) | Cola | Red wine | Olive oil |
| 9 (Ref.) | 1 | 5 | 1 | 1 |
| 12 (Ref.) | 2 | 4 | 1 | 1 |
| 10 | 3 | 4 | 4 | 5 |
| 11 | 4 | 5 | 4 | 4 |

It is clear that in accordance with the definition above, very good "easy-to-clean" properties are achieved with the inventive mixtures from examples 10 and 11. Moreover, the mortars comprising the powders of the invention are notable for very good mortar processing and for increased homogeneity of the mixture. The comparative mixture 12, which contains exclusively fluorine-free alkylsilane, thereby making the mortar surface hydrophobic but not oleophobic, exhibits, in contrast, no improvement in the cleaning properties, even in the case of aqueous soiling with coffee or red wine, in relation to the comparative mixture 9 without adjuvant.

Hydrophobizing Test With Composite Thermal Insulation Mortar Formula

A base formulation was produced, consisting of 34 parts of Portland cement CEM I 42.5R, 60.8 parts of a silica sand having an average particle size of 0.20 mm (silica sand F34), 3.0 parts of lime hydrate, 0.2 part of a methylhydroxyethylcellulose and 2 parts of a film-forming, water-redispersible dispersion powder based on a water-insoluble ethylene/vinyl acetate copolymer (Elotex FX2320). This formulation was admixed with 0.2 part of the powder indicated in table 3. 200 g of this premix were subsequently stirred with 22 parts by weight of water, based on 100 parts by weight of dry formulation, using a 60 mm propeller stirrer, at a speed of 950 rpm, for 60 seconds. After an aging time of 3 minutes, the mortar was briefly reagitated by hand and was drawn down using stencils on to cement fiberboard panels, to form stripes 3 mm thick, with a water absorption capacity of the panels of up to 20% by mass. After 24 hours of storage under standard conditions (23° C./50% relative humidity), the top half of one strip was abraded by about 1 mm with a corundum stone. Subsequently one drop of water in the quantity indicated was applied to both halves of the stripe, and a measurement was made of the time taken for the drop to be fully absorbed.

TABLE 3

A measurement was made of the time in minutes for one water drop (about 0.2 ml) to be fully absorbed by the set mortar.

| Powder | Without additive | CP1 (ref.) | P2 |
|---|---|---|---|
| Powder and amount | 0% (ref.) | 0.2% | 0.2% |
| Surface unabraded | 20 | 330 | 618 |
| Surface abraded | 1 | 55 | 520 |

The abraded mortar surface of the mortar without additive absorbs the water drop immediately, whereas the unabraded mortar surface is only slightly more hydrophobic. If, however, a hydrophobicizing powder is used (P1), only small amounts are needed in order to hydrophobize the surface. However, this effect is restricted to the surface. Indeed, if this surface is damaged, as for example by being abraded, there is a drastic reduction in the hydrophobizing effect. If, however, a powder according to the invention is used, the water drop not only takes twice as long to be absorbed by the mortar, but also the abraded surface exhibits almost as good hydrophobization, which suggests outstanding body hydrophobization. As a result of this pronounced hydrophobicity and oleophobicity, both aqueous and oily mixtures run off as beads and do not penetrate the mortar layer. If desired, they can also be soaked up completely and without problems on the substrate, without leaving any soiling.

These results are all the more surprising in view of the fact that only a very small amount of powder was used, in turn containing less than 20% by weight of a fluoroorganyl-substituted silicon compound. Furthermore, the cured mortars exhibit good adhesion to the substrate, good cohesion, and also no notable change in setting behavior.

Oleophobizing Test With a Joint Filler Mortar Formula

A base formulation was produced, consisting of 40 parts of Portland cement CEM I 52.5R, 3 parts of fused alumina cement (Ternal RG), 53.3 parts of a silica sand having an average particle size of 0.20 mm (silica sand F34), 0.1 part of tartaric acid, 1 part of a cellulose fiber, 1 part of titanium dioxide (Kronos 2190) and 2 parts of a film-forming, water-redispersible dispersion powder based on a water-insoluble ethylene/vinyl acetate copolymer (Elotex MP2100). This formulation was admixed with 0.2 part of the powder indicated in table 4. 200 g of this premix were subsequently stirred with 22 parts by weight of water, based on 100 parts by weight of dry formulation, using a 60 mm propeller stirrer, at a speed of 950 rpm, for 60 seconds. After an aging time of 3 minutes, the mortar was briefly reagitated by hand and was drawn down using stencils on to cement fiberboard panels, to form in each case two stripes 3 mm thick, with a water absorption capacity of the panels of up to 20% by mass. After 7 days of storage under standard conditions (23° C./50% relative humidity), one drop of olive oil (approximately 0.2 ml) was applied in each case, and the measurement was made of the time taken for the drop to be fully absorbed.

TABLE 4

The time in minutes for one drop of olive oil (about 0.2 ml) to be fully absorbed by the cured, unabraded mortar surface, depending on the powder used.

| Powder | Without additive | CP3 (ref.) | P4 | P5 | P6 | P7 |
|---|---|---|---|---|---|---|
| Powder and amount | 0% (ref.) | 0.2% | 0.2% | 0.2% | 0.2% | 0.2% |

TABLE 4-continued

The time in minutes for one drop of olive oil (about 0.2 ml) to be fully absorbed by the cured, unabraded mortar surface, depending on the powder used.

| Powder | Without additive | CP3 (ref.) | P4 | P5 | P6 | P7 |
|---|---|---|---|---|---|---|
| Fraction of F-silane[a] | 0% | 0% | 25% | 50% | 75% | 100% |
| Time [min] | 12 | 16 | 25 | 61 | 91 | 124 |

[a]Fraction of fluoroorganyl-substituted silicon compound ("F-silane") as a proportion of the total amount of dispersed silicon compound Without oleophobizing powder, a drop of olive oil is absorbed completely by the cured mortar within just a few minutes. Using an additive which carried out hydrophobization in the mortar has the effect only of a slight delay in the absorption of the water drop. If, however, increasing amounts of a fluoroorganyl-substituted silicon compound are admixed to the powder, there is a rapid intensification in the oleophobizing properties and hence also in the dirt repellency properties. The desirable "easy-to-clean" properties that are obtained as a result can be improved further by increasing the fraction of inventive powder. Moreover, the cured mortars exhibit good adhesion to the substrate, good cohesion, and no notable change in setting behavior.

Contact Angle Measurement on the Surface of the Joint Filler Mortar Formula

A joint filler mortar formula was produced as described above, and prisms with dimensions of 8×4×4 cm were produced in accordance with EN 12808-5, but without using forming oil. After 1 day, the prisms were removed from the formwork and, after a total of 28 days of storage under standard conditions (23° C./50% relative humidity), the contact angle of water and of olive oil was measured 2 minutes after drop application to one side face of the prisms. The contact angle was determined optically by means of a camera with a Krüss DSA100 contact angle apparatus. Evaluation took place using the instrument's internal drop contour analysis software DSA1 v1.90, using the "tangent method 1" method or the "circular segment method" for contact angles smaller than 30°.

TABLE 5

Contact angle measurement on the surface of the joint filler mortar formula, measured 2 minutes after drop application (about 20 μl of water or of olive oil). The more hydrophobic or oleophobic the surface of the mortar, the greater the contact angle of the respective drop.

| Test liquid | No additive (comparative) | PVOH [a] (comparative) | 0.2% powder Amount used | | 0.4% powder Amount used | |
|---|---|---|---|---|---|---|
| | | | CP3 (ref.) | P7 | CP3 (ref.) | P7 |
| | 0% (ref.) | 0.16% (ref.) | | | | |
| Water | 21.9 | 41.3 | 117.5 | 116.8 | 118.3 | 119.9 |
| Oliver oil | 5.7 | 14.5 | 37.3 | 97.9 | 52.4 | 101.2 |

[a] PVOH stands for the polyvinyl alcohol used in producing the powders P1 to P7. The amount of 0.16% used corresponds to the amount of polyvinyl alcohol added in the example with 0.4% of powder P7.

The values of table 5 shows impressively that the mortar surface without additive is neither hydrophobic nor oleophobic—in other words, both water and olive oil exhibit very good wetting, and this strongly promotes rapid absorption of the liquid. If polyvinyl alcohol is used as water-soluble polymer, which is present, for example, in the powder P7, there is no significant change in these mortar properties. If n-octyltriethoxysilane is encapsulated in water-soluble polymer and used in dried form as powder (CP3), there is indeed a sharp increase in the contact angle of the water drop, suggesting a good hydrophobic quantity. However, the drop of olive oil exhibits relatively good wetting both before and after, even when the amount used is increased. If, however, only 0.2% by weight of the inventive powder P7 is used, corresponding to an amount of only about 0.1% by weight of a fluoroorganyl-substituted silicon compound, then the mortar surface, surprisingly, already exhibits a very good oleophobic nature. This can be enhanced still further by increasing the amount of powder—in spite of the high fraction of hydrophilic polyvinyl alcohol that is present in the powder!

The invention claimed is:

1. A curable mixture, comprising:
   (I) a mineral binder;
   (II) a powder comprising a fluoroorganyl-substituted silicon compound encapsulated in a water-soluble polymer, wherein an amount of the fluoroorganyl-substituted silicon compound is from 0.001% to 8% by weight, based on the curable mixture; and
   (III) optionally, an additive.

2. The curable mixture of claim 1, wherein the mineral binder comprises a hydraulically setting binder selected from the group consisting of a Portland cement, a composite cement, a cement comprising a fraction of pozzolans, and a blast furnace cement.

3. The curable mixture of claim 1, wherein the fluoroorganyl-substituted silicon compound is a fluoroorganyl-substituted silane, a fluoroorganyl-substituted siloxane, a fluoroorganyl-substituted silicone, or any mixture thereof.

4. The curable mixture of claim 1, wherein the fluoroorganyl-substituted silicon compound is a fluoroalkylalkoxysilane of formula (I):

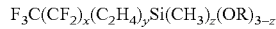

$$F_3C(CF_2)_x(C_2H_4)_ySi(CH_3)_z(OR)_{3-z} \quad (I),$$

wherein:
each R is independently a methyl, ethyl, n-propyl, or isopropyl;
x is an integer from 0 to 16;
y is 0 or 1; and
z is 0 or 1.

5. The curable mixture of claim 4, wherein the fluoroorganyl-substituted silicon compound is tridecafluoro-1,1,2,2-tetrahydrooctyltriethoxysilane, tridecafluoro-1,1,2,2-tetrahydrooctyltrimethoxysilane, or a mixture thereof.

6. The curable mixture of claim 1, wherein the fraction of the fluoroorganyl-substituted silicon compound in the powder is 2.5% to 90% by weight.

7. The curable mixture of claim 1, wherein the fluoroorganyl-substituted silicon compound is encapsulated in a water-soluble polymer and the water-soluble polymer and the silicon compound form particles which are dispersible and/or redispersible in water, and
wherein the water-soluble polymer is selected from the group consisting of a polysaccharide, a polysaccharide ether, a protein, a vinyl polymer, a formaldehyde condensate, and an alkylene oxide polymer.

8. The curable mixture of claim 1, wherein the liquid fluoroorganylalkoxy-substituted silicon compound is encapsulated in a water-soluble polymer, has an average droplet size of 10 nm to 10 μm, and is substantially nonhydrolyzed.

9. The curable mixture of claim 1, comprising an additive (III), which is an aggregate and an auxiliary, wherein the aggregate is selected from the group consisting of a sand, a gravel, a grit, porphyry, quartz flour, ground limestone, ground rock, a flyash, microsilica, and other silicatic additives.

10. The curable mixture of claim 1, comprising, based on a total mass of the curable mixture:
2% to 60% by weight of a hydraulic binder;
30% to 90% by weight of an aggregate;
0.001% to 8% by weight of a fluoroorganyl-substituted silicon compound; and
optionally 0% to 40% by weight of a further component.

11. The curable mixture of claim 10, in the form of a concrete mixture, further comprising, based on a total mass of the concrete mixture:
0.01% to 2% by weight of a plasticizer; and/or
0.01% to 10% by weight of a further auxiliary; or
in the form of a dry mortar further comprising based on a total mass of the dry mortar:
0.001% to 3% by weight of a cellulose ether and/or a cellulose fiber;
0.1% to 40% by weight of a dispersion powder comprising a water-insoluble, film-forming polymer; and
0% to 10% by weight of a further auxiliary.

12. The curable mixture of claim 1, further comprising:
1% to 50% by weight of water, based on a total weight of the curable mixture.

13. A water-redispersible powder, which hydrophobizes and oleophobizes a cured mixture of claim 1, comprising:
a water-soluble polymer comprising an organic silicon compound encapsulated therein; and
an organic silicon compound, which is wholly or partly fluorinated,
wherein the fraction of the fluorine-substituted silicon compound is at least 25% by weight, based on the total amount of the silicon compound.

14. The powder of claim 13, wherein the fluoroorganyl-substituted silicon compound is a fluoroalkylalkoxysilane of formula (I):

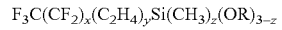

$$F_3C(CF_2)_x(C_2H_4)_ySi(CH_3)_z(OR)_{3-z} \quad (I),$$

wherein:
each R is independently a methyl, ethyl, n-propyl, or isopropyl;
x is an integer from 0 to 16;
y is 0 or 1; and
z is 0 or 1.

15. The powder of claim 14, wherein the fluoroorganyl-substituted silicon compound is tridecafluoro-1,1,2,2-tetrahydrooctyltriethoxysilane, tridecafluoro-1,1,2,2-tetrahydrooctyltrimethoxysilane, or a mixture thereof.

16. A method for producing the curable mixture of claim 1, the method comprising:
mixing (II) a mineral binder with (II) a powder comprising i) a water-soluble polymer comprising an organic silicon compound encapsulated therein and ii) an organic silicon compound, which is wholly or partly fluorinated, wherein the fraction of the fluorine-substituted silicon compound is at least 25% by weight, based on the total amount of the silicon compound.

17. A method for producing the powder of claim 13, the method comprising
mixing:
water;
a water-soluble polymer;
a water-insoluble fluoroorganyl-substituted silicon compound; and
optionally, an additive,
to obtain an intermediate at a pH between 4 and 9; and then drying the intermediate.

18. A process for hydrophobizing and oleophobizing a cured mixture comprising a mineral binder, the process comprising:
mixing the powder of claim 13 with a mixture comprising the mineral binder, to obtain a curable mixture; and
curing the curable mixture.

19. A concrete good or concrete molding, comprising the powder of claim 13.

20. A process for body modification of a hydraulically setting mixture, the process comprising:
adding the powder of claim 13 to a hydraulically setting mixture.

21. A process for hydrophobizing and oleophobizing a cured mixture, the process comprising:
mixing cement, an aggregate, a fluoroorganyl-substituted silicon compound which is encapsulated in a water-soluble polymer, and optionally, a further auxiliary, to obtain a hydraulically curable mixture comprising 2% to 60% by weight of the cement, 30% to 90% by weight of the aggregate, 0.001% to 8% by weight of the fluoroorganyl-substituted silicon compound, and optionally the further auxiliary.

22. A concrete good or concrete molding, comprising the mixture of claim 1.

23. A facing concrete, comprising the mixture of claim 1.

24. A method of both hydrophobizing and oleophobizing a cured product, the method comprising:
including, in a curable mixture in need thereof, a powder comprising a fluoroorganyl-substituted silicon compound encapsulated in a water-soluble polymer, and
curing the curable mixture, thereby obtaining the cured product,
wherein the curable mixture is the curable mixture of claim 14.

\* \* \* \* \*